United States Patent
Gohlke et al.

(10) Patent No.: US 9,741,095 B2
(45) Date of Patent: Aug. 22, 2017

(54) METHOD FOR ELECTRONIC ZOOM WITH SUB-PIXEL OFFSET

(71) Applicant: RAYTHEON COMPANY, Waltham, MA (US)

(72) Inventors: Mark Gohlke, McKinney, TX (US); Christopher J. Baker, McKinney, TX (US); Trent A. Jacobs, McKinney, TX (US)

(73) Assignee: RAYTHEON COMPANY, Waltham, MA (US)

( * ) Notice: Subject to any disclaimer, the term of this patent is extended or adjusted under 35 U.S.C. 154(b) by 218 days.

(21) Appl. No.: 14/167,708

(22) Filed: Jan. 29, 2014

(65) Prior Publication Data

US 2015/0213578 A1    Jul. 30, 2015

(51) Int. Cl.
  *G06T 3/40*   (2006.01)
  *G06T 13/00*  (2011.01)
  *G09G 5/00*   (2006.01)

(52) U.S. Cl.
  CPC .......... *G06T 3/4007* (2013.01); *G06T 3/4092* (2013.01)

(58) Field of Classification Search
  CPC ........ G06T 13/00; G06T 3/4007; G09G 5/391
  USPC ........................................ 345/475, 606, 667
  See application file for complete search history.

(56) References Cited

U.S. PATENT DOCUMENTS

| | | | |
|---|---|---|---|
| 6,803,954 B1 | 10/2004 | Hong et al. | |
| 2002/0169900 A1* | 11/2002 | Hiji | G06F 13/28 710/22 |
| 2003/0095558 A1* | 5/2003 | Chung | H04L 12/5693 370/417 |
| 2005/0088385 A1* | 4/2005 | Elliott | G06T 3/4007 345/87 |
| 2006/0062327 A1* | 3/2006 | Dally | H04L 7/033 375/316 |
| 2008/0208941 A1* | 8/2008 | Koyanagi | G06T 3/4007 708/313 |
| 2010/0214936 A1* | 8/2010 | Ito | G06K 9/00986 370/252 |
| 2012/0272024 A1 | 10/2012 | Park et al. | |
| 2012/0302876 A1* | 11/2012 | Van Stevendaal | A61B 6/12 600/424 |

(Continued)

FOREIGN PATENT DOCUMENTS

CN    101 216 935    7/2008

OTHER PUBLICATIONS

Sichuan Panovasic Technology, Jul. 9, 2008, Chinese Patent Application CN101216935 English translation.*

(Continued)

*Primary Examiner* — Gregory J Tryder
*Assistant Examiner* — Yi Yang
(74) *Attorney, Agent, or Firm* — Lewis Roca Rothgerber Christie LLP

(57) ABSTRACT

A system and method for interpolating between pixels of an image for providing zoom and pan features. A piecewise cubic spline is used to find the values of each of four provisional interpolation points in each of four rows of an image and, similarly, a piecewise cubic spline is used to interpolate between the provisional interpolation points to find the value of a point in the output image. Boundary conditions used to constrain the coefficients of the piecewise cubic spline provide enhanced quality in the output image.

14 Claims, 5 Drawing Sheets

(56) References Cited

U.S. PATENT DOCUMENTS

2012/0324191 A1   12/2012  Strange et al.
2013/0169849 A1*   7/2013  Kato ................. H04N 5/23293
                                                                         348/333.01
2013/0339412 A1*  12/2013  Burgess .................... G06F 5/01
                                                                            708/209

OTHER PUBLICATIONS

Parker et al., "Comparison of Interpolating Methods for Image Resampling", IEEE Transactions on Medical Imaging, vol. MI-2:1, 1983, 31-39.

Bhatnagar, "Survey: Spline Based Interpolation Methods for Image Magnification", International Journal of Scientific & Engineering Research, vol. 4, Issue 5, May 2013 (pp. 2236-2241).

Hou, et al., "Cubic Splines for Image Interpolation and Digital Filtering", IEEE Transactions on Acoustics, Speech and Signal Processing, IEEE Inc., New York, USA, vol. ASSP-26, No. 1 Dec. 1978 (pp. 508-517).

McKinley, et al., "Cubic Spline Interpolation", Internet Citation, URL:http://web.archive.org/web/2000925190833/http://online.redwoods.cc.ca.us/instruct/darnold/laproj/Fall98/SkyMeg/Proj.PDF, Sep. 25, 2000 (7 pgs.).

Written Opinion of the International Searching Authority for International Application No. PCT/US2014/066451, filed Nov. 19, 2014, Written Opinion of the International Searching Authority mailed May 19, 2015 (8 pgs.).

International Search Report for International Application No. PCT/US2014/066451, filed Nov. 19, 2014, International Search Report dated May 11, 2015 and mailed May 19, 2015 (4 pgs.).

* cited by examiner

METHOD FOR ELECTRONIC ZOOM WITH SUB-PIXEL OFFSET

STATEMENT REGARDING FEDERALLY SPONSORED RESEARCH OR DEVELOPMENT

This invention was made with Government support. The Government has certain rights in the invention.

BACKGROUND

1. Field

One or more aspects of embodiments according to the present invention relate to zoom and offset of digital images, and more particularly to a system and method of interpolating between pixels.

2. Description of Related Art

When viewing a digital image with a viewing device, such as a display, that has a different number of pixels than the image, the original image may be cropped if it is larger than the display, or, if the original image is smaller than the display, it may be displayed on a portion of the display with the remainder of the display not used for the original image, and, e.g., left blank or filled with a different, background image. Neither of these approaches provides an optimal display image for the viewer, with the former hiding portions of the image from the viewer, and the latter providing an image that does not use the full viewing area of the display. In such cases it is desirable to resize the original image to fit the display. This will in general require a process known as interpolating between pixels of the original image, referred to herein as the input image, to form the image to be displayed, referred to herein as the output image, i.e., to find an appropriate pixel value for each color to be displayed in each pixel of the display. Interpolation may also be used to allow a viewer to zoom in on a portion of an image, or to pan a display, which is showing only a part of an image, across the image. In such applications interpolation may be helpful to allow a continuous range of zoom and pan settings. Interpolation may be applied repeatedly to form a new image, referred to herein as an output image, from the original image.

Such interpolation may for example be accomplished using a digital filter. A high performance filter, however, may use a 7×7 portion of the image around each pixel to be interpolated and may require a large table of intermediate coefficient values. These coefficients may change depending on the input data phase. This technique therefore places significant computational load on an image processing system. Moreover, it may support only a limited number of pre-programmed zooms or offsets, i.e., pan settings.

Interpolation may also be accomplished using bilinear interpolation, which supports continuous pan and zoom, but is not suitable for high performance imaging, because of the inferior image quality it produces. Bicubic piecewise polynomial spline techniques outperform bilinear interpolation but nonetheless do not provide ideal image quality. Thus, a system and method for interpolation which provides good image quality without imposing heavy computational loads is needed.

SUMMARY

Aspects of embodiments of the present invention are directed to interpolating between pixels of an image for providing zoom and pan features. A piecewise cubic spline is used to find the values of each of four provisional interpolation points in each of four rows of an image and, similarly, a piecewise cubic spline is used to interpolate between the provisional interpolation points to find the value of a point in the output image. Boundary conditions used to constrain the coefficients of the piecewise cubic spline provide enhanced quality in the output image.

According to an embodiment of the present invention there is provided a system for generating an interpolated value at a first interpolation point between two central source points of a set of four source points, the four source points aligned along a first direction, each source point having a value, the system comprising: a processing unit configured to calculate the interpolated value as: $f_0(a) = a_0 a^3 + b_0 a^2 + c_0 a + d_0$, wherein $$\begin{bmatrix} a_0 \\ b_0 \\ c_0 \\ d_0 \end{bmatrix} = Q \begin{bmatrix} y_{-1} \\ y_0 \\ y_1 \\ y_2 \end{bmatrix},$$

wherein: $y_{-1}$ is a value of a second-nearest source point in a first direction parallel to a first image axis; $y_0$ is a value of a nearest source point in the first direction; $y_1$ is a value of a nearest source point in a second direction opposite the first direction; $y_2$ is a value of a second-nearest source point in the second direction; a is the ratio of: the distance between the first interpolation point and the nearest source point in the first direction; to the distance between the nearest source point in the first direction and the nearest source point in the second direction; and Q is substantially equal to $$\begin{bmatrix} -0.3333 & 1 & -1 & 0.3333 \\ 0.8 & -1.8 & 1.2 & -0.2 \\ -0.4667 & -0.2 & 0.8 & -0.1333 \\ 0 & 1 & 0 & 0 \end{bmatrix}.$$

In one embodiment, the four source points are four provisional interpolation points, and the first interpolation point is an ultimate interpolation point.

In one embodiment, the processing unit is configured to calculate $a_0$, $b_0$, $c_0$, and $d_0$, according to $$\begin{bmatrix} a_0 \\ b_0 \\ c_0 \\ d_0 \end{bmatrix} = Q \begin{bmatrix} y_{-1} \\ y_0 \\ y_1 \\ y_2 \end{bmatrix},$$

wherein Q is substantially equal to $$\begin{bmatrix} -0.3333 & 1 & -1 & 0.3333 \\ 0.8 & -1.8 & 1.2 & -0.2 \\ -0.4667 & -0.2 & 0.8 & -0.1333 \\ 0 & 1 & 0 & 0 \end{bmatrix}.$$

In one embodiment, the processing unit is configured to calculate $a_0$, $b_0$, $c_0$, and $d_0$ by multiplying each element of Q that is equal to neither 0 nor 1 by an element of the vector $$\begin{bmatrix} y_{-1} \\ y_0 \\ y_1 \\ y_2 \end{bmatrix}.$$

In one embodiment, the system includes at least one synchronous dynamic random access memory (SDRAM) configured to store an input image.

In one embodiment, the system includes a first SDRAM to store the input image and a second SDRAM to store an output image.

In one embodiment, the first SDRAM and the second SDRAM are the same SDRAM.

In one embodiment, the processing unit comprises a ring buffer configured to hold four lines of an image, the processing unit configured to select from each of the four lines four pixels at a time as source points.

In one embodiment, the processing unit is configured to interpolate four times, each time using four pixels as source points, to form four provisional interpolation values, and to interpolate from the four provisional interpolation values to form a value in an output image.

In one embodiment, the ring buffer is configured to hold two additional lines of an image, and the processing unit is configured to transfer data from the first memory to lines of the ring buffer not being used, at the time of the transfer, as source points.

In one embodiment, the processing unit is configured to calculate the interpolated value using fixed-point arithmetic.

In one embodiment, the processing unit is configured to represent the quantity a using 32-bit fixed-point arithmetic including one sign bit, 25 bits to the left of the binary point, and 6 bits to the right of the binary point.

According to an embodiment of the present invention there is provided a method for generating an interpolated value at a first interpolation point between two central source points of a set of four source points, the four source points aligned along a first direction, each source point having a value, the method comprising: calculating the interpolated value as: $f_0(a) = a_0 a^3 + b_0 a^2 + c_0 a + d_0$ wherein $$\begin{bmatrix} a_0 \\ b_0 \\ c_0 \\ d_0 \end{bmatrix} = Q \begin{bmatrix} y_{-1} \\ y_0 \\ y_1 \\ y_2 \end{bmatrix},$$

wherein: $y_{-1}$ is a value of a second-nearest source point in a first direction parallel to a first image axis; $y_0$ is a value of a nearest source point in the first direction; $y_1$ is a value of a nearest source point in a second direction opposite the first direction; $y_2$ is a value of a second-nearest source point in the second direction; a is the ratio of: the distance between the first interpolation point and the nearest source point in the first direction; to the distance between the nearest source point in the first direction and the nearest source point in the second direction; and Q is substantially equal to $$\begin{bmatrix} -0.3333 & 1 & -1 & 0.3333 \\ 0.8 & -1.8 & 1.2 & -0.2 \\ -0.4667 & -0.2 & 0.8 & -0.1333 \\ 0 & 1 & 0 & 0 \end{bmatrix}.$$

In one embodiment, the method includes calculating $a_0$, $b_0$, $c_0$, and $d_0$, according to $$\begin{bmatrix} a_0 \\ b_0 \\ c_0 \\ d_0 \end{bmatrix} = Q \begin{bmatrix} y_{-1} \\ y_0 \\ y_1 \\ y_2 \end{bmatrix},$$

wherein Q is substantially equal to $$\begin{bmatrix} -0.3333 & 1 & -1 & 0.3333 \\ 0.8 & -1.8 & 1.2 & -0.2 \\ -0.4667 & -0.2 & 0.8 & -0.1333 \\ 0 & 1 & 0 & 0 \end{bmatrix}.$$

In one embodiment, the act of calculating $a_0$, $b_0$, $c_0$, and $d_0$ comprises multiplying each element of Q that is equal to neither 0 nor 1 by an element of the vector $$\begin{bmatrix} y_{-1} \\ y_0 \\ y_1 \\ y_2 \end{bmatrix}.$$

In one embodiment, the four source points are four pixels of an image.

In one embodiment, the four source points are four provisional interpolation points.

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of a method for electronic zoom with sub-pixel offset provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

The digital image being processed may be rectangular, and it may be convenient to associate a horizontal direction in the image with a first axis, e.g., an X axis, and a vertical direction in the image with a second axis, e.g., a Z axis. Each pixel may then have a location in the X-Z coordinate system corresponding to the coordinates of the pixel in that coordinate system.

Figure 1:
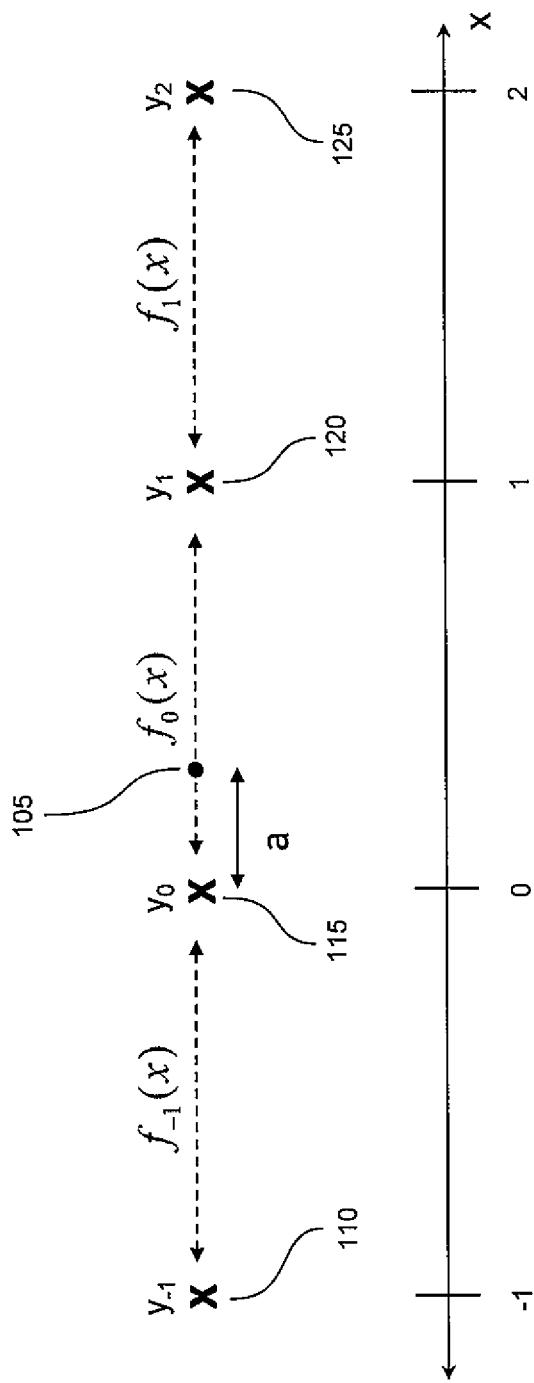
FIG. 1 is a sketch of four source points used to interpolate to an interpolation point according to an embodiment of the present invention.
Figure 4:
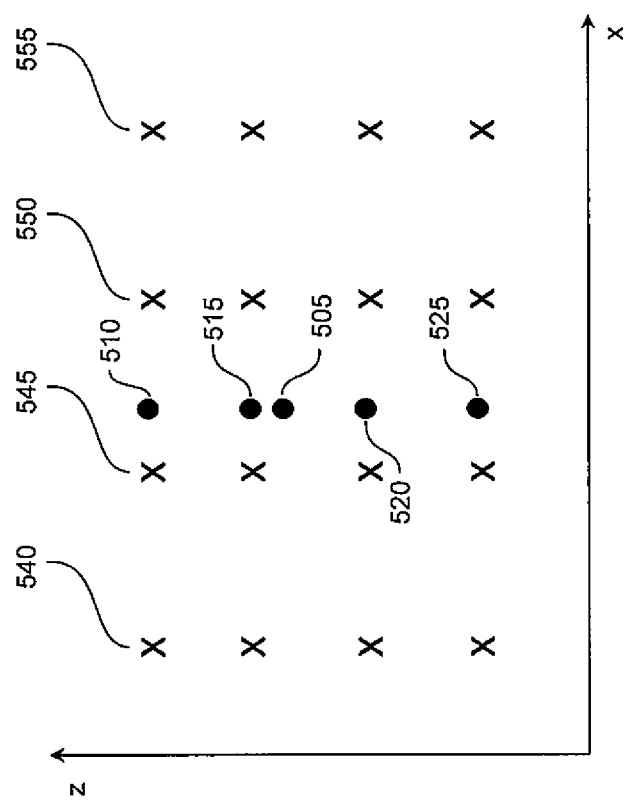
FIG. 4 is an illustration of a two-dimensional array of pixels, and the locations of provisional interpolation points and of an ultimate interpolation point according to an embodiment of the present invention.
Figure 5B:
FIG. 5B is a block diagram of a ring buffer, according to an embodiment of the present invention.
Figure 5A:
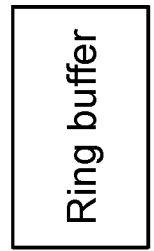
FIG. 5A is a block diagram of a synchronous dynamic random access memory (SDRAM), according to an embodiment of the present invention.

Referring to FIG. 1, according to an embodiment of the present invention, an interpolation technique for finding a value at an interpolation point 105, may be implemented based on a piecewise cubic spline. Such a technique may result in improved image quality with acceptable processing requirements. FIG. 1 shows a sequence of four source points 110, 115, 120, 125 contiguous along a line parallel to an axis. The source points 110, 115, 120, 125 may, for examples, be pixels in an input image, or they may be provisional interpolation points formed by a set of preceding interpolation operations (FIG. 4). The axis may without loss of generality be identified as the X-axis, and the four source points 110, 115, 120, 125 may, without loss of generality, be assumed to be at X-coordinates of −1, 0, 1, and 2, respectively. Each of the four source points 110, 115, 120, 125 has a value which may correspond, for example, to the intensity of a color, e.g., red, green, or blue; a corresponding value at the interpolation point 105 is sought. In another example, the value may instead correspond to a grayshade. If, for example, the value of each pixel corresponds to the intensity of red at that pixel, then the interpolation process described herein results in an interpolated value at the interpolation point 105 which corresponds to the interpolated intensity of red at the interpolation point 105. The interpolation process described herein may then be repeated for the green and blue intensities, to generate interpolated values of red, blue, and green at the interpolation point 105.

A value may be interpolated at a point 105 by generating a piecewise cubic function over the three contiguous inter-pixel intervals and evaluating the piecewise cubic function at the interpolation point 105. The first of these intervals is between the source point 110 at X=−1 and the source point 115 at X=0, the second of these intervals is between the source point 115 at X=0 and the source point 120 at X=1 and the third of these intervals is between the source point 120 at X=1 and the source point 125 at X=2.

The corresponding three cubic functions forming the piecewise cubic spline may be written $$f_{-1}(x)=a_{-1}(x+1)^3+b_{-1}(x+1)^2+c_{-1}(x+1)+d_{-1} \; -1 \le x \le 0$$

$$f_0(x)=a_0(x)^3+b_0(x)^2+c_0(x)+d_0 \; 0 \le x \le 1$$

$$f_1(x)=a_1(x-1)^3+b_1(x-1)^2+c_1(x-1)+d_{-1} \; 1 \le x \le 2$$

respectively. Once the four coefficients $a_0$, $b_0$, $c_0$, and $d_0$ are found, the value at the interpolation point is given by $f_0(a)=a_0(a)^3+b_0(a)^2+c_0(a)+d_0$.

The 12 coefficients $a_i$, $b_i$, $c_i$, and $d_i$ may be selected so that the piecewise cubic spline takes on the values $y_{-1}$, $y_0$, $y_1$, and $y_2$ at the four source points 110, 115, 120, 125:

$$f_{-1}(-1)=y_{-1}$$

$$f_{-1}(0)=f_0(0)=y_0$$

$$f_0(1)=f_1(1)=y_1$$

$$f_1(2)=y_2$$

This set of six constraints is not sufficient to uniquely determine the 12 coefficients $a_i$, $b_i$, $c_i$, and $d_i$, and, moreover, these constraints do not ensure that the spline is smooth at the source points; the first derivative may be discontinuous at the source points, for example. Requiring that the spline be smooth, in the sense that the first and second derivatives be continuous at the source points 115, 120, results in four additional constraints:

$$f'_{-1}(0)=f'_0(0)$$

$$f'_0(1)=f'_1(1)$$

$$f''_{-1}(0)=f''_0(0)$$

$$f''_0(1)=f''_1(1)$$

Finally, two additional constraints may be obtained from the assumption that the spline is relaxed or natural, i.e., that the second derivatives vanish at the ends of the spline, at the source points 110, 125:

$$f''_{-1}(-1)=0$$

$$f_1''(2)=0$$

The first and second derivatives of the three cubic functions, in terms of the coefficients $a_i$, $b_i$, $c_i$, and $d_i$ are obtained by differentiating:

$$f'_{-1}(x)=3a_{-1}(x+1)^2+2b_{-1}(x+1)+c_{-1} \; -1 \le x \le 0$$

$$f'_0(x)=3a_0(x)^2+2b_0(x)+c_0 \; 0 \le x \le 1$$

$$f'_1(x)=3a_1(x-1)^2+2b_1(x-1)+c_1 \; 1 \le x \le 2$$

$$f''_{-1}(x)=6a_{-1}(x+1)+2b_{-1} \; -1 \le x \le 0$$

$$f''_0(x)=6a_0(x)+2b_0 \; 0 \le x \le 1$$

$$f''_1(x)=6a_1(x-1)+2b_1 \; 1 \le x \le 2$$

Applying the constraints on the values of the three cubic functions, and on their derivatives, then results in sets of equations for the 12 coefficients $a_i$, $b_i$, $c_i$, and $d_i$. For the first cubic function, these equations are:

$$f_{-1}(-1)=d_{-1}=y_{-1}$$

$$f_{-1}(0)=a_{-1}+b_{-1}+c_{-1}+d_{-1}=y_0$$

$$f'_{-1}(-1)=c_{-1}$$

$$f'_{-1}(0)=3a_{-1}+2b_{-1}+c_{-1}=f'_0(0)$$

$$f''_{-1}(-1)=2b_{-1}=0$$

$$f''_{-1}(0)=6a_{-1}+2b_{-1}=f''_0(0)$$

For the second cubic function, the equations for the coefficients $a_i$, $b_i$, $c_i$, and $d_i$ are:

$$f_0(0)=d_0=y_0$$

$$f_0(1)=a_0+b_0+c_0+d_0=y_1$$

$$f'_0(0)=c_0=f'_{-1}(0)$$

$$f'_0(1)=3a_0+2b_0+c_0=f'_1(1)$$

$f''_0(0)=2b_0 =f''_{-1}(0)$ $f''_0(1)=6a_0+2b_0 =f''_1(1)$

Finally, for the third cubic function, the equations for the coefficients $a_i$, $b_i$, $c_i$, and $d_i$ are:

$f_1(1)=d_1 =y_1$ $f_1(2)=a_1+b_1+c_1+d_1 =y_2$ $f'_1(1)=c_1 =f'_0(0)$ $f'_1(2)=3a_1+2b_1+c_1$ $f''_1(1)=2b_1 =f''_0(1)$ $f''_1(2)=6a_1+2b_1 =0$

These equations may be rewritten as a set of equations with the values $y_{-1}$, $y_0$, $y_1$, and $y_2$ on the left-hand side and the coefficients $a_i$, $b_i$, $c_i$, and $d_i$ on the right-hand side:

$y_{-1}=d_{-1}$ $y_0=a_{-1}+b_{-1}+c_{-1}+d_{-1}$ $0=3a_{-1}+2b_{-1}+c_{-1}-c_0$ $0=2b_{-1}$ $0=6a_{-1}+2b_{-1}-2b_0$ $y_0=d_0$ $y_1=a_0+b_0+c_0+d_0$ $0=3a_0+2b_0+c_0-c_1$ $0=6a_0+2b_0-2b_1$ $y_1=d_1$ $y_2=a_1+b_1+c_1+d_1$ $0=6a_1+2b_1$

This set of equations may be written in the matrix form $M\vec{q}=\vec{y}$, where $$\vec{q}=\begin{bmatrix} a_{-1} \\ b_{-1} \\ c_{-1} \\ d_{-1} \\ a_0 \\ b_0 \\ c_0 \\ d_0 \\ a_1 \\ b_1 \\ c_1 \\ d_1 \end{bmatrix}, \vec{y}=\begin{bmatrix} y_{-1} \\ y_0 \\ 0 \\ 0 \\ 0 \\ y_0 \\ y_1 \\ 0 \\ 0 \\ y_1 \\ y_2 \\ 0 \end{bmatrix}, \text{ and}$$

$$M=\begin{bmatrix} 0 & 0 & 0 & 1 & 0 & 0 & 0 & 0 & 0 & 0 & 0 & 0 \\ 1 & 1 & 1 & 1 & 0 & 0 & 0 & 0 & 0 & 0 & 0 & 0 \\ 3 & 2 & 1 & 0 & 0 & 0 & -1 & 0 & 0 & 0 & 0 & 0 \\ 0 & 2 & 0 & 0 & 0 & 0 & 0 & 0 & 0 & 0 & 0 & 0 \\ 6 & 2 & 0 & 0 & 0 & -2 & 0 & 0 & 0 & 0 & 0 & 0 \\ 0 & 0 & 0 & 0 & 0 & 0 & 0 & 1 & 0 & 0 & 0 & 0 \\ 0 & 0 & 0 & 0 & 1 & 1 & 1 & 1 & 0 & 0 & 0 & 0 \\ 0 & 0 & 0 & 0 & 3 & 2 & 1 & 0 & 0 & 0 & -1 & 0 \\ 0 & 0 & 0 & 0 & 6 & 2 & 0 & 0 & 0 & -2 & 0 & 0 \\ 0 & 0 & 0 & 0 & 0 & 0 & 0 & 0 & 0 & 0 & 0 & 1 \\ 0 & 0 & 0 & 0 & 0 & 0 & 0 & 0 & 1 & 1 & 1 & 1 \\ 0 & 0 & 0 & 0 & 0 & 0 & 0 & 0 & 6 & 2 & 0 & 0 \end{bmatrix}.$$

The four coefficients $a_0$, $b_0$, $c_0$, and $d_0$ are needed to evaluate the cubic spline at the interpolation point 105. These may be obtained by inverting the equation $M\vec{q}=\vec{y}$:

$\vec{q}=M^{-1}\vec{y}$, and extracting from the vector $\vec{q}$ the four coefficients $a_0$, $b_0$, $c_0$, and $d_0$:

$$\begin{bmatrix} a_0 \\ b_0 \\ c_0 \\ d_0 \end{bmatrix}=\begin{bmatrix} 0 & 0 & 0 & 0 & 1 & 0 & 0 & 0 & 0 & 0 & 0 & 0 \\ 0 & 0 & 0 & 0 & 0 & 1 & 0 & 0 & 0 & 0 & 0 & 0 \\ 0 & 0 & 0 & 0 & 0 & 0 & 1 & 0 & 0 & 0 & 0 & 0 \\ 0 & 0 & 0 & 0 & 0 & 0 & 0 & 1 & 0 & 0 & 0 & 0 \end{bmatrix}M^{-1}\begin{bmatrix} y_{-1} \\ y_0 \\ 0 \\ 0 \\ 0 \\ y_0 \\ y_1 \\ 0 \\ 0 \\ y_1 \\ y_2 \\ 0 \end{bmatrix}$$

Inverting M and calculating the matrix product above results in the following explicit expression for the four coefficients $a_0$, $b_0$, $c_0$, and $d_0$:

$$\begin{bmatrix} a_0 \\ b_0 \\ c_0 \\ d_0 \end{bmatrix}=\frac{1}{90}\begin{bmatrix} -30 & 90 & -90 & 30 \\ 72 & -162 & 108 & -18 \\ -42 & -18 & 72 & -12 \\ 0 & 90 & 0 & 0 \end{bmatrix}\begin{bmatrix} y_{-1} \\ y_0 \\ y_1 \\ y_2 \end{bmatrix}$$

which may be rewritten as $$\begin{bmatrix} a_0 \\ b_0 \\ c_0 \\ d_0 \end{bmatrix}=Q\begin{bmatrix} y_{-1} \\ y_0 \\ y_1 \\ y_2 \end{bmatrix},$$

with $$Q = \begin{bmatrix} -0.3333 & 1 & -1 & 0.3333 \\ 0.8 & -1.8 & 1.2 & -0.2 \\ -0.4667 & -0.2 & 0.8 & -0.1333 \\ 0 & 1 & 0 & 0 \end{bmatrix}.$$

Finally, the interpolated value $f_0(a)$ at the interpolation point 105, at which $x=a$, may be written $f_0(a)=a_0 a^3 + b_0 a^2 + c_0 a + d_0$, with the coefficients $a_0$, $b_0$, $c_0$, and $d_0$ found as described above.

Figure 2A:
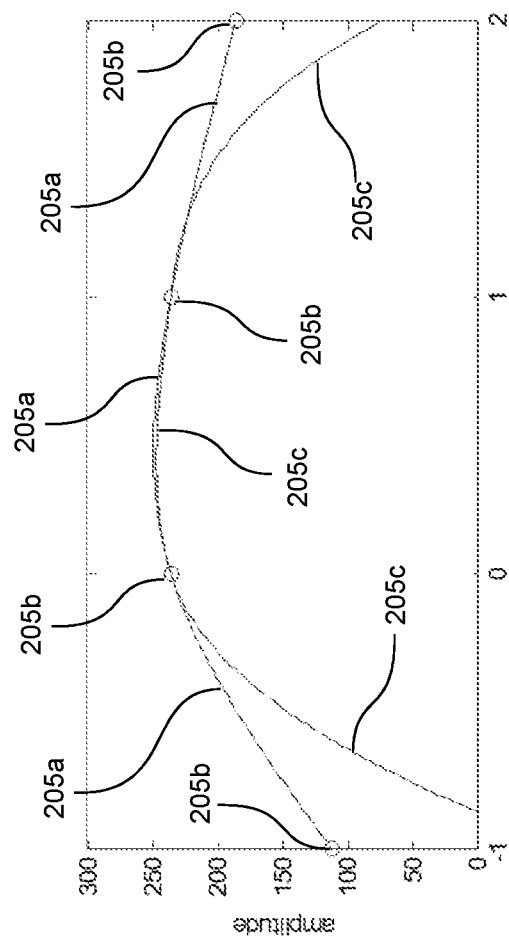
FIG. 2A is a plot of a cubic spline formed according to an embodiment of the present invention along with a plot of a cubic spline formed according to an alternate method.
Figure 2B:
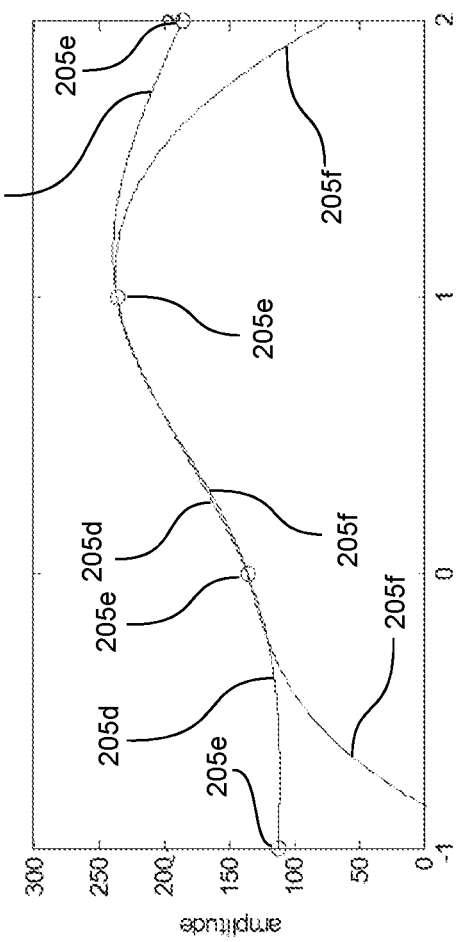
FIG. 2B is a plot of a cubic spline formed according to an embodiment of the present invention along with a plot of a cubic spline formed according to an alternate method.

Referring to FIG. 2A, a cubic spline formed according to an embodiment of the present invention may form the curve 205a through a set of source points 205b. An alternate cubic spline, which uses coefficients $$\begin{bmatrix} a_0 \\ b_0 \\ c_0 \\ d_0 \end{bmatrix} = Q' \begin{bmatrix} y_{-1} \\ y_0 \\ y_1 \\ y_2 \end{bmatrix},$$

with $$Q' = \begin{bmatrix} -0.5 & 1.5 & -1.5 & 0.5 \\ 1 & -2.5 & 2 & -0.5 \\ -0.5 & 0 & 0.5 & 0 \\ 0 & 1 & 0 & 0 \end{bmatrix}.$$

may instead form the curve 205c, which also passes through the source points 205b but does not satisfy all of the constraints listed above, and defines different interpolated values at various points along the spline. Similarly, in FIG. 2B, a cubic spline formed according to an embodiment of the present invention may form the curve 205d through a set of source points 205e, and an alternate cubic spline may instead form the curve 205f.

Figure 3:
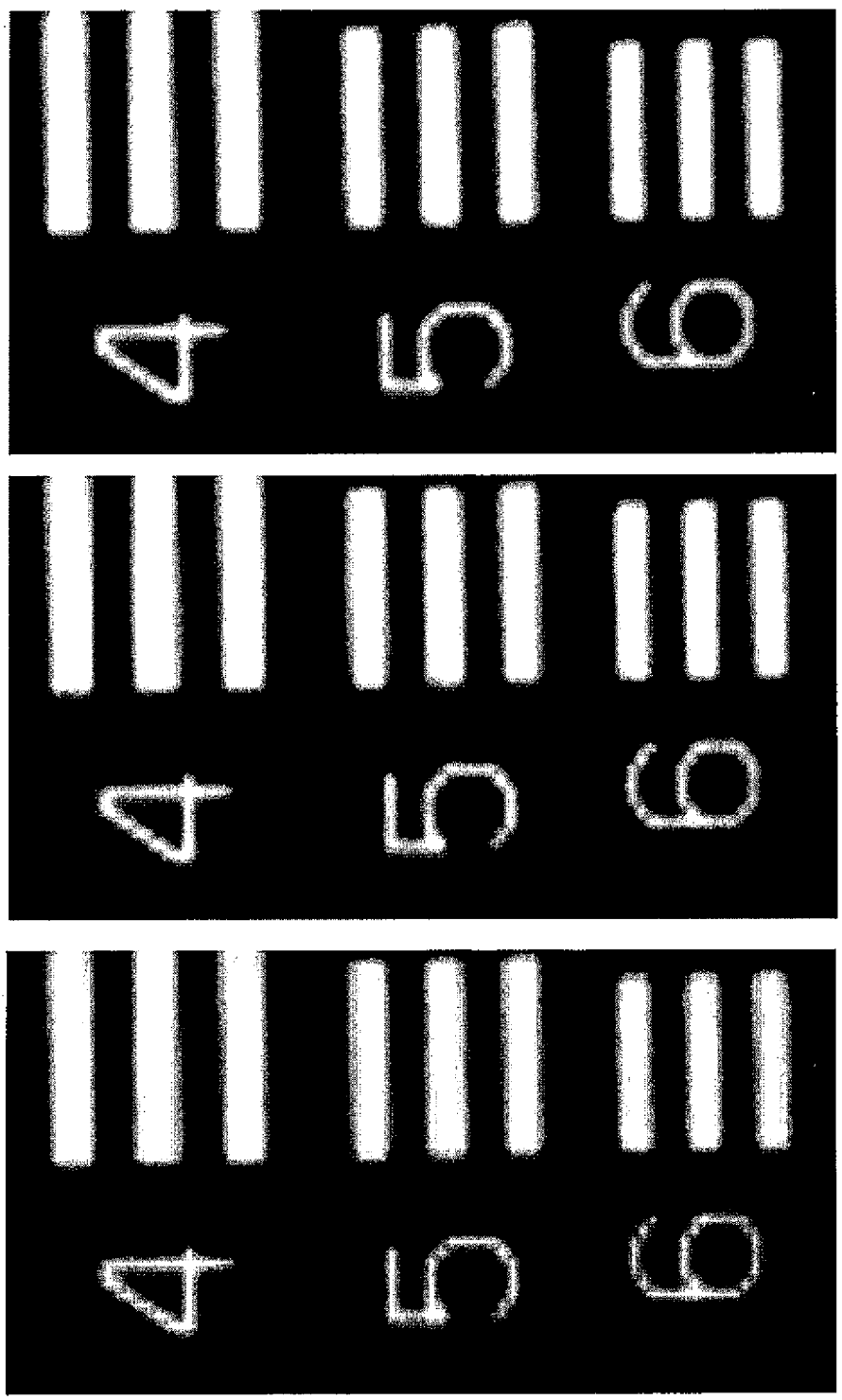
FIG. 3 is an image formed using an interpolation method according to an embodiment of the present invention, along with images formed using alternate methods.

Differences between various approaches to interpolation may be seen in the three images in FIG. 3, all of which are images interpolated with a zoom factor of 5.351. In FIG. 3, the leftmost image was formed using bilinear interpolation, the middle image was formed using a fixed bicubic spline, and the rightmost image was formed using a cubic spline according to an embodiment of the present invention.

To perform interpolation in two dimensions, as for example in the images of FIG. 3, the method described above with reference to FIGS. 1, 2A, and 2B may be employed in two stages. Referring to FIG. 4, to find an interpolated value at the ultimate interpolation point 505, the sixteen nearest pixels may be used, i.e., the sixteen pixels included in the two columns of pixels to the right of the point 505 and the two columns to the left of the point 505, and in the two rows above and the two rows below the point 505. In a first stage, provisional interpolated values may be found at each of four provisional interpolation points 510, 515, 520, 525 by employing a cubic spline interpolation according to an embodiment of the present invention.

For example, the method may be applied to the pixels 540, 545, 550, 555 in the first row to obtain a provisional interpolated value at the provisional interpolation point 510. In this step the interpolation uses: (i) the value of the second-nearest pixel, to the provisional interpolation point 510, in a first direction parallel to an image axis (the −X direction), i.e., the pixel 540, (ii) the value of the nearest pixels in the first direction, i.e., the pixel 545, (iii) the value of the nearest pixel in a second direction opposite the first direction (the +X direction), i.e., the pixel 550, and (iv) the value of the second-nearest pixel in the second direction, i.e., the pixel 555. The pixels in the second, third, and fourth rows may then be used to obtain provisional interpolation values at the provisional interpolation points 515, 520, and 525 respectively.

Finally, in a second stage, the four provisional interpolation values at the provisional interpolation points 510, 515, 520, 525 may be used to obtain the interpolated value at the ultimate interpolation point 505, again using a cubic spline according to an embodiment of the present invention. This phase uses: (i) the value of the second-nearest provisional interpolation point, to the ultimate interpolation point 505, in a third direction parallel to an image axis (the −Z direction), i.e., the provisional interpolation point 525, (ii) the value of the nearest provisional interpolation point in the third direction, i.e., the provisional interpolation point 520, (iii) the value of the nearest provisional interpolation point in a second direction opposite the first direction (the +Z direction), i.e., the provisional interpolation point 515, and (iv) the value of the second-nearest provisional interpolation point in the second direction, i.e., the provisional interpolation point 510.

Thus, referring to FIG. 1, the interpolation point 105 may be an ultimate interpolation point, i.e., an output image pixel, or it may be a provisional image point. The source points may be input image pixels (e.g., if the output image pixel is aligned with a row or column of the input image), or they may be provisional interpolation points.

Embodiments of the present invention are computationally efficient and also provide the capability to interpolate images to essentially arbitrary zoom factors, which need not be the same along the two axes of an image. The resulting images are virtually free of artifacts, providing a higher quality output to the viewer.

Interpolation may be performed with embodiments which include a processing unit. The term "processing unit" is used herein to include any combination of hardware, firmware, and software, employed to process data or digital signals. Processing unit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs).

It may be advantageous, when performing interpolations, to minimize the number of operations required in the processing unit. This may be accomplished, for example, when evaluating $$\begin{bmatrix} a_0 \\ b_0 \\ c_0 \\ d_0 \end{bmatrix} = Q \begin{bmatrix} y_{-1} \\ y_0 \\ y_1 \\ y_2 \end{bmatrix},$$

by omitting the step of multiplication for elements, of the matrix Q, that are either 0 (in which case the product is 0) or 1 (in which case the product is the corresponding element of the vector $$\begin{bmatrix} y_{-1} \\ y_0 \\ y_1 \\ y_2 \end{bmatrix}.$$

For example, because the last row of the matrix Q is composed of three zeroes and a one, the value of $d_0$ is simply $y_0$, i.e., $d_0$ may be obtained without performing any multiplications. For efficiency, the calculations involved in interpolating may be performed using fixed-point arithmetic, using for example a 25Q6 format with a sign bit, i.e., a format having six bits to the right of the binary point, which may also be written Q25.6.

The value of the position a, relative to the nearest source point in a first direction, of the point to be interpolated may be calculated, from the zoom and offset of the output image relative to the input image, as the fractional part of the sum of (i) the offset and (ii) the ratio of (a) the position, in the original image, of the nearest source point in the first direction to (b) the zoom factor, where a zoom factor greater than 1 corresponds to magnification. In operation, a general purpose computer or other processing unit may feed the offset and the reciprocal of the zoom factor to the processing unit performing the interpolation, so that the latter need not perform a division operation but may instead multiply by the reciprocal of the zoom factor. In one embodiment the reciprocal of the zoom factor is an unsigned fixed point number, e.g., an unsigned 2Q30 fixed point number.

The location of the point in the binary representations of both the sub-pixel offset and the zoom factor may be selected in each case as a trade between the range of zoom control available and the zoom resolution, within limits determined by the required interpolation accuracy.

In one embodiment, the input image is stored in synchronous dynamic random access memory (SDRAM), and the output image may also be stored, and if so it may be stored in the same or in a separate SDRAM, as it is formed. The interpolation is performed by a special purpose processing unit which may be based on an FPGA or ASIC. Line buffers are used between the SDRAM and the processing unit, as first-in, first-out (FIFO) structures for clock domain transfer between the SDRAM and the processing unit. The processing unit contains a ring buffer storing, for example, six lines of the input image, from which four lines are used at any time, according to the algorithm disclosed above, to generate one line of the output image. If the zoom factor is greater than 1, then in some instances, to form a subsequent line of the output image, the same four lines of the input image will be required, and in some instances an additional line of the input image will be needed, and a previously used line of the input image will no longer be needed. A ring buffer is well suited to these data requirements, as a new line may be read in to the buffer at the same time as four other lines in the buffer are being processed to form a line of the output image. If the zoom factor is less than 1, but not less than ½, then as many as two additional lines of the input image may be needed in the buffer when one line of the output image has been formed and the processing unit begins forming the subsequent line. Thus, in one embodiment, a 6-line ring buffer is used in the processing unit.

Although limited embodiments of a method for electronic zoom with sub-pixel offset have been specifically described and illustrated herein, many modifications and variations will be apparent to those skilled in the art. Accordingly, it is to be understood that the method for electronic zoom with sub-pixel offset employed according to principles of this invention may be embodied other than as specifically described herein. The invention is also defined in the following claims, and equivalents thereof.

What is claimed is:

1. A system for generating an interpolated value at a first interpolation point between two central source points of a set of four source points, the four source points aligned along a first direction, each source point having a value, the system comprising:
   a display; and
   a processing unit configured to calculate the interpolated value as a first cubic function $f_0(a)$, wherein:

$$f_0(a) = a_0 a^3 + b_0 a^2 + c_0 a + d_0$$

wherein $$\begin{bmatrix} a_0 \\ b_0 \\ c_0 \\ d_0 \end{bmatrix} = Q \begin{bmatrix} y_{-1} \\ y_0 \\ y_1 \\ y_2 \end{bmatrix},$$

wherein:
   $y_{-1}$ is a value of a second-nearest source point in a first direction parallel to a first image axis;
   $y_0$ is a value of a nearest source point in the first direction;
   $y_1$ is a value of a nearest source point in a second direction opposite the first direction and parallel to the first image axis;
   $y_2$ is a value of a second-nearest source point in the second direction;
   a is the ratio of:
      the distance between the first interpolation point and the nearest source point in the first direction; to
      the distance between the nearest source point in the first direction and the nearest source point in the second direction; and
   Q is equal to $$\begin{bmatrix} -0.3333 & 1 & -1 & 0.3333 \\ 0.8 & -1.8 & 1.2 & -0.2 \\ -0.4667 & -0.2 & 0.8 & -0.1333 \\ 0 & 1 & 0 & 0 \end{bmatrix}.$$

the first cubic function being one of three cubic functions forming a piecewise cubic spline, the cubic spline taking the value of each source point at the source point and having a vanishing second derivative at the second-nearest source point in the first direction and at the second-nearest source point in the second direction,
   the processing unit being further configured to set a pixel value for a color of a pixel of the display to the interpolated value,
   wherein the four source points are four provisional interpolation points, and the first interpolation point is an ultimate interpolation point,
   wherein the processing unit is configured to interpolate four times in a third direction, each time using four pixels as source points, to form the four provisional interpolation points, and to interpolate from the four provisional interpolation points, in a fourth direction, perpendicular to the third direction, to form the interpolated value.

2. The system of claim 1, wherein the processing unit is configured to calculate $a_0$, $b_0$, $c_0$, and $d_0$, according to $$\begin{bmatrix} a_0 \\ b_0 \\ c_0 \\ d_0 \end{bmatrix} = Q \begin{bmatrix} y_{-1} \\ y_0 \\ y_1 \\ y_2 \end{bmatrix},$$

wherein Q is equal to $$\begin{bmatrix} -0.3333 & 1 & -1 & 0.3333 \\ 0.8 & -1.8 & 1.2 & -0.2 \\ -0.4667 & -0.2 & 0.8 & -0.1333 \\ 0 & 1 & 0 & 0 \end{bmatrix}.$$

3. The system of claim 2, wherein the processing unit is configured to calculate $a_0$, $b_0$, $c_0$, and $d_0$ by multiplying only each element of Q that is equal to neither 0 nor 1 by an element of the vector $$\begin{bmatrix} y_{-1} \\ y_0 \\ y_1 \\ y_2 \end{bmatrix}.$$

4. The system of claim 1, comprising at least one synchronous dynamic random access memory (SDRAM) configured to store an input image.

5. The system of claim 4, comprising a first SDRAM to store the input image and a second SDRAM to store an output image.

6. The system of claim 5, wherein the first SDRAM and the second SDRAM are different SDRAMs.

7. The system of claim 4, wherein the processing unit comprises a ring buffer configured to hold four lines of an image, the processing unit configured to select from each of the four lines four pixels at a time as source points.

8. The system of claim 7, wherein the ring buffer is configured to hold two additional lines of an image, and the processing unit is configured to transfer data from the first memory to lines of the ring buffer not being used, at the time of the transfer, as source points.

9. The system of claim 1, wherein the processing unit is configured to calculate the interpolated value using fixed-point arithmetic.

10. The system of claim 9, wherein the processing unit is configured to represent the quantity a using 32-bit fixed-point arithmetic including one sign bit, 25 bits to the left of the binary point, and 6 bits to the right of the binary point.

11. A method for generating an interpolated value at a first interpolation point between two central source points of a set of four source points, the four source points aligned along a first direction, each source point having a value, the method comprising:

calculating the interpolated value as a first cubic function $f_0(a)$, wherein:

$$f_0(a) = a_0 a^3 + b_0 a^2 + c_0 a + d_0$$

wherein $$\begin{bmatrix} a_0 \\ b_0 \\ c_0 \\ d_0 \end{bmatrix} = Q \begin{bmatrix} y_{-1} \\ y_0 \\ y_1 \\ y_2 \end{bmatrix},$$

wherein:

$y_{-1}$ is a value of a second-nearest source point in a first direction parallel to a first image axis;

$y_0$ is a value of a nearest source point in the first direction;

$y_1$ is a value of a nearest source point in a second direction opposite the first direction and parallel to the first image axis;

$y_2$ is a value of a second-nearest source point in the second direction;

a is the ratio of:

the distance between the first interpolation point and the nearest source point in the first direction; to the distance between the nearest source point in the first direction and the nearest source point in the second direction; and Q is equal to $$\begin{bmatrix} -0.3333 & 1 & -1 & 0.3333 \\ 0.8 & -1.8 & 1.2 & -0.2 \\ -0.4667 & -0.2 & 0.8 & -0.1333 \\ 0 & 1 & 0 & 0 \end{bmatrix}.$$

the first cubic function being one of three cubic functions forming a piecewise cubic spline, the cubic spline taking the value of each source point at the source point and having a vanishing second derivative at the second-nearest source point in the first direction and at the second-nearest source point in the second direction, the method further comprising setting a pixel value for a color of a pixel of a display to the interpolated value, wherein the four source points are four provisional interpolation points, and the first interpolation point is an ultimate interpolation point, the method comprising interpolating four times in a third direction, each time using four pixels as source points, to form the four provisional interpolation points, and interpolating from the four provisional interpolation points, in a fourth direction, perpendicular to the third direction, to form the interpolated value.

12. The method of claim 11, comprising calculating $a_0$, $b_0$, $c_0$, and $d_0$, according to $$\begin{bmatrix} a_0 \\ b_0 \\ c_0 \\ d_0 \end{bmatrix} = Q \begin{bmatrix} y_{-1} \\ y_0 \\ y_1 \\ y_2 \end{bmatrix},$$

wherein Q is equal to $$\begin{bmatrix} -0.3333 & 1 & -1 & 0.3333 \\ 0.8 & -1.8 & 1.2 & -0.2 \\ -0.4667 & -0.2 & 0.8 & -0.1333 \\ 0 & 1 & 0 & 0 \end{bmatrix}.$$

13. The method of claim 12, wherein the act of calculating $a_0$, $b_0$, $c_0$, and $d_0$ comprises multiplying only each element of Q that is equal to neither 0 nor 1 by an element of the vector $$\begin{bmatrix} y_{-1} \\ y_0 \\ y_1 \\ y_2 \end{bmatrix}.$$

14. The method of claim 11, wherein the four source points are four pixels of an image.

\* \* \* \* \*